US012148297B2

(12) United States Patent
Sakamoto et al.

(10) Patent No.: US 12,148,297 B2
(45) Date of Patent: Nov. 19, 2024

(54) IN-VEHICLE APPARATUS, ROADSIDE APPARATUS, AND COMMUNICATION METHOD

(71) Applicant: Panasonic Intellectual Property Management Co., Ltd., Osaka (JP)

(72) Inventors: Takenori Sakamoto, Kanagawa (JP); Hiroyuki Motozuka, Kanagawa (JP); Kosei Nakano, Kanagawa (JP); Akihiro Egami, Tokyo (JP); Masataka Irie, Kanagawa (JP)

(73) Assignee: Panasonic Intellectual Property Management CO., Ltd., Osaka (JP)

( * ) Notice: Subject to any disclaimer, the term of this patent is extended or adjusted under 35 U.S.C. 154(b) by 67 days.

(21) Appl. No.: 18/155,647

(22) Filed: Jan. 17, 2023

(65) Prior Publication Data

US 2023/0162606 A1    May 25, 2023

Related U.S. Application Data

(63) Continuation of application No. PCT/JP2021/026657, filed on Jul. 15, 2021.

(30) Foreign Application Priority Data

Jul. 21, 2020 (JP) .................. 2020-124499
Oct. 29, 2020 (JP) .................. 2020-181293

(51) Int. Cl.
*G08G 1/09* (2006.01)
*G08G 1/0967* (2006.01)
(Continued)

(52) U.S. Cl.
CPC ......... *G08G 1/096783* (2013.01); *G08G 1/09* (2013.01); *H04W 4/02* (2013.01);
(Continued)

(58) Field of Classification Search
CPC ...... G07B 15/00; G07B 15/06; G07B 15/063; G05D 1/00; G05D 1/0088; G06K 9/00;
(Continued)

(56) References Cited

U.S. PATENT DOCUMENTS 11,010,643 B1 * 5/2021 Campbell ........... G06F 16/9032
2010/0114708 A1   5/2010 Ooba et al.
(Continued)

FOREIGN PATENT DOCUMENTS

JP       2007086964 A    4/2007
JP          4059078 B2    3/2008
(Continued)

OTHER PUBLICATIONS

NPL Search (May 20, 2024).*
International Search Report, mailed Sep. 28, 2021, for International Patent Application No. PCT/JP2021/026657. (5 pages) (with English Translation).

*Primary Examiner* — Van T Trieu
(74) *Attorney, Agent, or Firm* — Seed IP Law Group LLP

(57) ABSTRACT

An in-vehicle apparatus to be mounted in a vehicle includes receiving circuitry, which, in operation, receives, from a roadside apparatus providing a distribution service of a road video, an advertisement message indicating that the distribution service is provided; control circuitry, which, in operation, generates, based on reception of the advertisement message, a message regarding transmission of the road video to the roadside apparatus; and transmitting circuitry, which, in operation, transmits the message to the roadside apparatus.

16 Claims, 13 Drawing Sheets

(51) Int. Cl.
  *H04W 4/02* (2018.01)
  *H04W 4/44* (2018.01)
  *H04W 4/48* (2018.01)
  *G08G 1/04* (2006.01)

(52) U.S. Cl.
  CPC .............. *H04W 4/44* (2018.02); *H04W 4/48* (2018.02); *G08G 1/04* (2013.01)

(58) Field of Classification Search
  CPC .... G06K 9/00812; G06K 9/62; G06K 9/6263; G08G 1/00; G08G 1/07; G08G 1/14; G01C 21/00; G01C 21/3833; H04W 4/02; H04W 4/025; H04W 4/44
  See application file for complete search history.

(56) References Cited

U.S. PATENT DOCUMENTS

| | | | |
|---|---|---|---|
| 2014/0210646 A1* | 7/2014 | Subramanya | B61L 29/28 |
| | | | 348/148 |
| 2016/0198466 A1 | 7/2016 | Yang et al. | |
| 2019/0068434 A1* | 2/2019 | Moreira da Mota | H04L 41/40 |
| 2022/0343694 A1* | 10/2022 | Wu | G07C 5/008 |

FOREIGN PATENT DOCUMENTS

| | | | |
|---|---|---|---|
| JP | 2010108420 A | 5/2010 | |
| JP | 4876498 B2 | 2/2012 | |

\* cited by examiner

| ELEMENT NAME | EXPLANATION |
|---|---|
| CAMERA ID | UNIQUE ID FOR IDENTIFYING ROADSIDE CAMERA |
| CAMERA INSTALLATION POSITION | INDICATION OF INSTALLATION POSITION OF ROADSIDE CAMERA BY LATITUDE AND LONGITUDE |
| CAMERA SHOOTING DIRECTION | INDICATION OF SHOOTING DIRECTION OF ROADSIDE CAMERA BY AZIMUTH ANGLE (DUE NORTH = 0 DEGREES) |

| ELEMENT NAME | EXPLANATION |
|---|---|
| CAMERA ID | UNIQUE ID FOR IDENTIFYING ROADSIDE CAMERA |
| CAMERA INSTALLATION POSITION | INDICATION OF INSTALLATION POSITION OF ROADSIDE CAMERA BY LATITUDE AND LONGITUDE |
| CAMERA SHOOTING DIRECTION | INDICATION OF SHOOTING DIRECTION OF ROADSIDE CAMERA BY AZIMUTH ANGLE (DUE NORTH = 0 DEGREES) |
| INTERSECTION ID | IDENTIFICATION ID OF INTERSECTION WHERE ROADSIDE APPARATUS AND ROADSIDE CAMERA ARE INSTALLED |
| LANE ID | IDENTIFICATION ID OF LANE SHOT BY ROADSIDE CAMERA |
| URL | URL TO VIDEO DATA (E.G. URL TO LOCAL SERVER OF ROADSIDE APPARATUS) |

FIG. 8

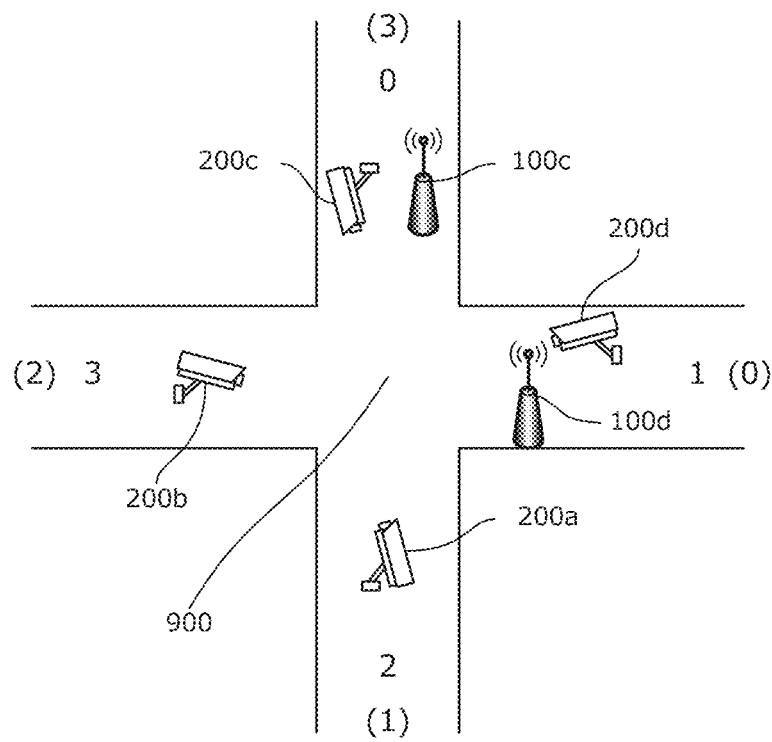

FIG. 9

IN-VEHICLE APPARATUS, ROADSIDE APPARATUS, AND COMMUNICATION METHOD

TECHNICAL FIELD

The present disclosure relates to an in-vehicle apparatus, a roadside apparatus, and a communication method.

BACKGROUND ART

Dedicated Short Range Communications (DSRC) are examples of radio communication used in Intelligent Transport System (ITS). In IEEE 802.11p, a technology based on radio local area network (LAN) technology is studied as a standard compatible with DSRC.

Patent Literature (hereinafter, referred to as PTL) 1 discloses a method in which a roadside camera is installed at an intersection for transmitting a video to a right-turning vehicle by a radio signal, thereby displaying a video of a blind spot.

CITATION LIST

Patent Literature

PTL 1
Japanese Patent Application Laid-Open No. 2007-086964

SUMMARY OF INVENTION

In road-to-vehicle communication, however, there are no specifications for providing distribution services of a video of a road (herein also simply referred to as "road video") shot by cameras installed at places such as intersections (herein, examples of the video of an object include videos and images of the object).

One non-limiting and exemplary embodiment of the present disclosure facilitates providing an in-vehicle apparatus that can receive a distribution service of a road video (herein also simply referred to as "road video distribution service"), and providing a roadside apparatus and a communication method.

An in-vehicle apparatus according to one exemplary embodiment of the present disclosure includes: receiving circuitry, which, in operation, receives, from a roadside apparatus providing a distribution service of a road video, an advertisement message indicating that the distribution service is provided; message generating circuitry, which, in operation, generates, based on reception of the advertisement message, a message regarding transmission of the road video to the roadside apparatus; and transmitting circuitry, which, in operation, transmits the message regarding the transmission of the road video to the roadside apparatus.

A roadside apparatus according to one exemplary embodiment of the present disclosure includes: transmitting circuitry, which, in operation, transmits an advertisement message indicating provision of a distribution service of a road video; receiving circuitry, which, in operation receives a message regarding transmission of the road video from an in-vehicle apparatus; message generating circuitry, which, in operation, generates, based on receipt of the message regarding the transmission of the road video, a video distribution message including identification information, an installation position, and a shooting direction of a camera capturing the road video, and transmits the video distribution message to the in-vehicle apparatus.

A roadside apparatus according to one exemplary embodiment of the present disclosure includes: transmitting circuitry, which, in operation, transmits an advertisement message that indicates provision of a distribution service of a road video and includes pieces of identification information, installation positions, and shooting directions of a plurality of cameras each shooting a road; and receiving circuitry, which, in operation, receives a message regarding transmission of the road video from an in-vehicle apparatus. In the roadside apparatus, the transmitting circuitry transmits, based on reception of the message regarding the transmission of the road video, a video signal of the road video captured by at least one camera among the plurality of cameras to the in-vehicle apparatus.

A communication method according to one exemplary embodiment of the present disclosure is used by an in-vehicle apparatus and includes: receiving, from a roadside apparatus providing a distribution service of a road video, an advertisement message indicating that the distribution service is provided; generating, based on the receiving of the advertisement message, a message regarding transmission of the road video to the roadside apparatus; and transmitting the message regarding the transmission of the road video to the roadside apparatus.

A communication method according to one exemplary embodiment of the present disclosure is used by a roadside apparatus and includes: transmitting an advertisement message indicating provision of a distribution service of a road video; receiving a message regarding transmission of the road video from an in-vehicle apparatus; generating, based on the receiving of the message regarding the transmission of the road video, a video distribution message including identification information, an installation position, and a shooting direction of a camera capturing the road video; and transmitting the video distribution message to the in-vehicle apparatus.

A communication method according to one exemplary embodiment of the present disclosure is used by a roadside apparatus and includes: transmitting an advertisement message that indicates provision of a distribution service of a road video and includes pieces of identification information, installation positions, and shooting directions of a plurality of cameras each shooting a road; receiving a message regarding transmission of the road video from an in-vehicle apparatus; and transmitting, based on the receiving of the message regarding the transmission of the road video, a video signal of the road video captured by at least one camera among the plurality of cameras to the in-vehicle apparatus.

It should be noted that general or specific embodiments may be implemented as a system, a method, an integrated circuit, a computer program, a storage medium, or any selective combination thereof.

According to one exemplary embodiment of the present disclosure, an in-vehicle apparatus can receive a road video distribution service.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 8 illustrates a variation of the elements included in the video distribution message;

FIG. 9 is a diagram for explaining a variation of a method for setting the shooting direction of a camera;

DESCRIPTION OF EMBODIMENTS

Hereinafter, one or more embodiments of the present disclosure will be described in detail with reference to the drawings. However, a detailed description more than necessary may be omitted, such as a detailed description of a well-known matter and a duplicate description for a substantially identical configuration, to avoid unnecessary redundancy of the following description and to facilitate understanding by a person skilled in the art.

The accompanying drawings and the following description are provided for a person skilled in the art to understand the present disclosure sufficiently, and are not intended to limit the subject matter recited in the claims.

In intersections in right-hand traffic such as in the United States, right turns may be possible even at red lights. For turning a vehicle right, the driver stops the vehicle before making a right turn and check for possible collisions with another vehicle entering the intersection from the left. A vehicle in the lane on the left side of the right-turning vehicle may make difficult to visually recognize another vehicle entering the intersection from the left because the left view is blocked from the driver. In addition, for turning a vehicle left at an intersection, a vehicle waiting for a left turn in the oncoming lane may make difficult to visually recognize another vehicle coming straight in the oncoming lane to enter the intersection.

Figure 1:
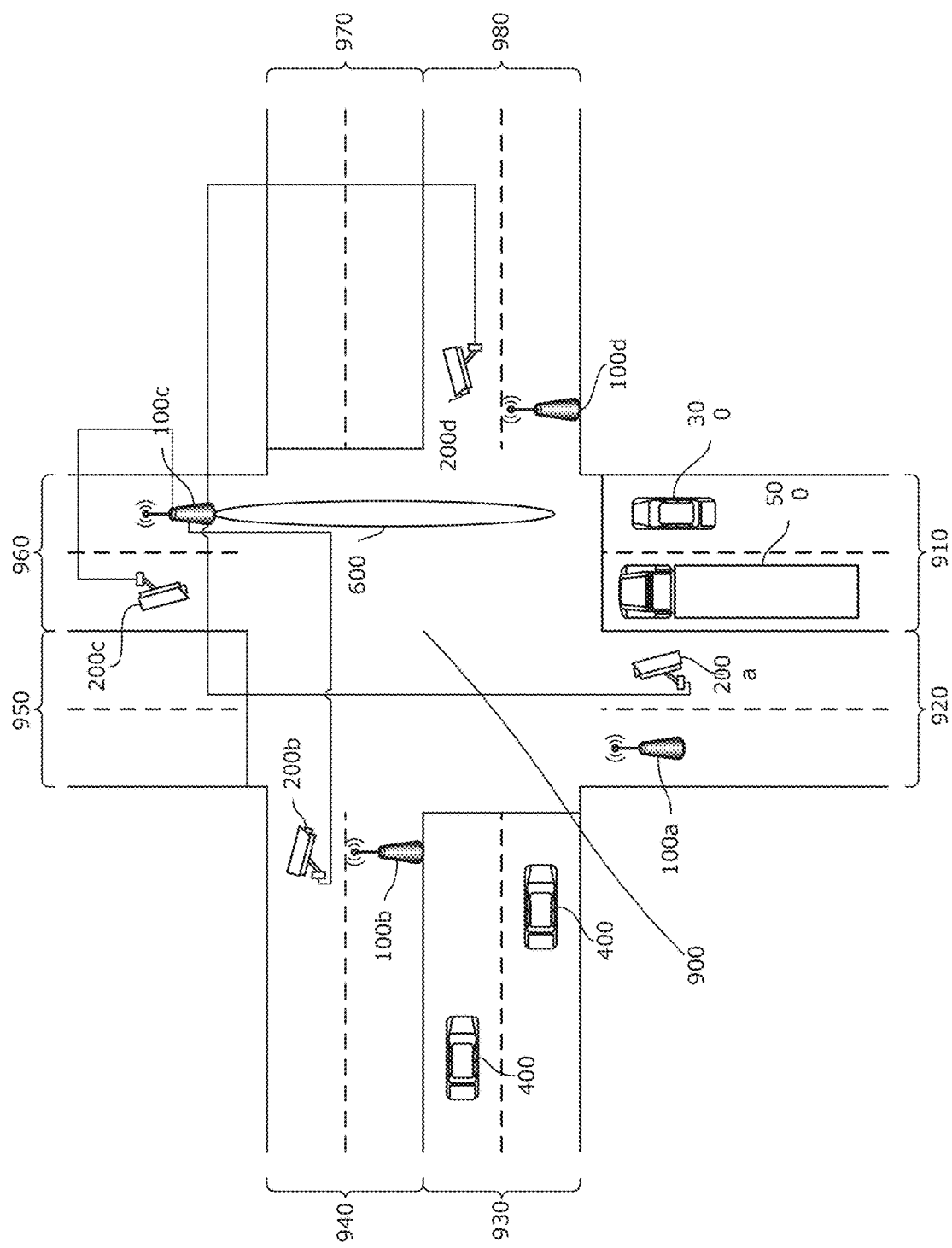
FIG. 1 illustrates an exemplary configuration of a road-vehicle cooperation system for driving assistance (herein also simply referred to as "road-vehicle cooperation driving assistance system")

FIG. 1 illustrates an exemplary configuration of a road-vehicle cooperation driving assistance system according to the present disclosure. Intersection 900 illustrated in FIG. 1 includes roads 910, 920, 930, 940, 950, 960, 970, and 980. In the example of FIG. 1, vehicles are kept to the right side of a road.

Roadside apparatuses are installed at intersection 900. Each roadside apparatus performs radio communication with an in-vehicle apparatus (not illustrated) of a vehicle entering intersection 900 (see the following examples). At intersection 900, installed is roadside apparatus 100a for performing radio communication with an in-vehicle apparatus of a vehicle (not illustrated) traveling on road 950 to enter intersection 900. At intersection 900, installed is roadside apparatus 100b for performing radio communication with an in-vehicle apparatus of a vehicle (not illustrated) traveling on road 970 to enter intersection 900. At intersection 900, installed is roadside apparatus 100c for performing radio communication with in-vehicle apparatuses of vehicles 300 and 500 traveling on road 910 to enter intersection 900. At intersection 900, installed is roadside apparatus 100d for performing radio communication with in-vehicle apparatuses of vehicles 400 traveling on road 930 to enter intersection 900.

Hereinafter, when roadside apparatuses 100a to 100d are not distinguished from each other, they may be referred to as roadside apparatuses 100. In FIG. 1, roadside apparatuses 100 are illustrated on the roads for simplification of the drawing; however, roadside apparatus 100 may be installed on, for example, a structure such as a traffic light or a utility pole. Roadside apparatuses 100 may be interconnected by, for example, wired or radio backhaul lines.

At intersection 900, roadside cameras for shooting vehicles entering intersection 900 are installed. For example, roadside camera 200a for shooting road 950 is installed at intersection 900. Roadside camera 200b for shooting road 970 is installed at intersection 900. Roadside camera 200c for shooting road 910 is installed at intersection 900. Roadside camera 200d for shooting road 930 is installed at intersection 900.

Hereinafter, when roadside cameras 200a to 200d are not distinguished from each other, they may be referred to as roadside cameras 200.

Roadside cameras 200 a to 200d are connected to each of roadside apparatuses 100. For example, roadside cameras 200a to 200 d are connected to roadside apparatus 100c as illustrated in FIG. 1. In FIG. 1, the illustration of how roadside apparatuses 100a, 100b, and 100d are connected to roadside cameras 200 is omitted for simplification of the drawing.

Roadside camera 200 may be connected to neighboring roadside apparatus 100 and connected to the other roadside apparatuses 100 via a backhaul line connecting roadside apparatuses 100. For example, roadside camera 200a may be connected to neighboring roadside apparatus 100a and connected to the other roadside apparatuses 100b to 100d via a backhaul line of roadside apparatuses 100.

Roadside apparatus 100 performs radio communication with an in-vehicle apparatus mounted in a vehicle by using millimeter waves. For example, directional beam 600—with millimeter waves—of roadside apparatus 100c is steered toward road 910. This configuration allows roadside apparatus 100c to perform radio communication with the in-vehicle apparatuses of vehicles 300 and 500 traveling on road 910 to enter intersection 900. In a similar manner, roadside apparatuses 100a, 100b, and 100d perform radio communication with the in-vehicle apparatuses of vehicles entering intersection 900 by using directional beams with millimeter waves. The communication area of directional beam 600 with millimeter waves is inside intersection 900 in FIG. 1; however, the communication area may reach road 910 or 920.

As described below, roadside apparatus 100 may perform radio communication with the in-vehicle apparatus by using microwaves when transmitting a service advertisement message such as Wave Service Advertisement (WSA).

In addition, roadside apparatus 100 and an in-vehicle apparatus to be mounted in a vehicle may perform radio communication according to a wireless system conforming to IEEE802.11p (also referred to as "Wireless Access in Vehicular Environments (WAVE)"), for example.

Vehicle 300 illustrated in FIG. 1 is in a process of a right turn from road 910 to road 980. A large vehicle 500 is stopped in the lane on the left side of vehicle 300. Therefore, road 930 on the left side may be poorly visible for the driver of vehicle 300. For example, vehicle 400 travelling straight on road 930 to enter intersection 900 may be difficult for the driver of vehicle 300 to see.

Roadside apparatus 100 advertises to the in-vehicle apparatus (notifies the in-vehicle apparatus of) provision of a road video distribution service—the road video is captured by roadside camera 200 installed at intersection 900—by using, for example, a service advertisement message such as WSA. This configuration, for example, allows the in-vehicle apparatus of vehicle 300 to recognize the road video distribution service at intersection 900, and to receive the video of road 930 captured by roadside camera 200d. Therefore, the visibility for the driver of vehicle 300 in the left direction is improved.

Figure 2:
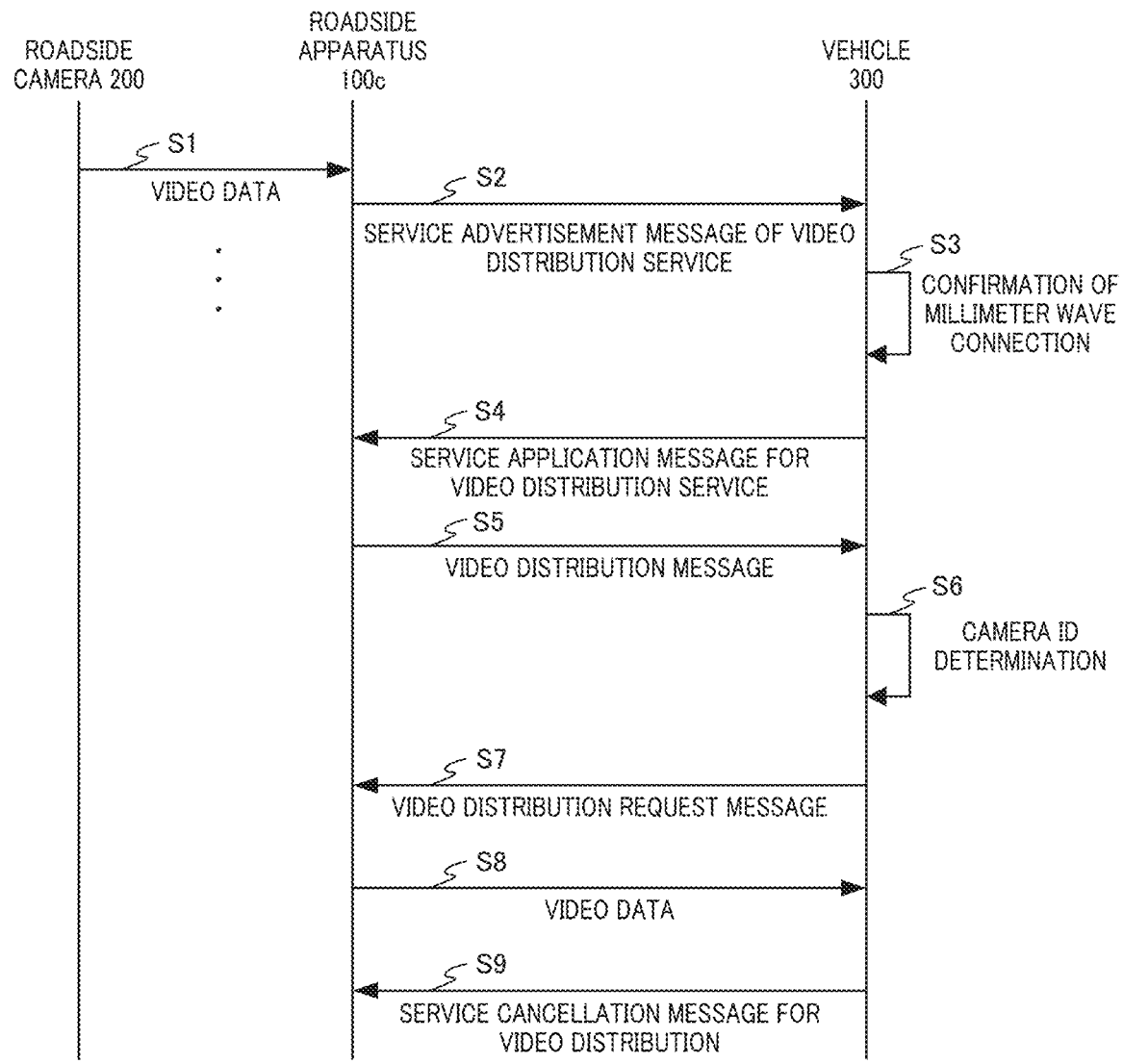
FIG. 2 is a sequence diagram schematically illustrating an exemplary operation of the road-vehicle cooperation driving assistance system.

FIG. 2 is a sequence diagram schematically illustrating an exemplary operation of the road-vehicle cooperation driving assistance system. FIG. 2 illustrates a sequence example when vehicle 300 traveling on road 910 enters intersection 900.

Roadside camera 200 transmits captured video data (e.g., data of a video captured by the camera) to roadside apparatus 100c (S1).

Roadside apparatus 100c transmits a service advertisement message indicating provision of a video distribution service for advertising to (notifying) vehicle 300 (in-vehicle apparatus mounted in vehicle 300) that the video distribution service is provided (S2).

The service advertisement message includes service IDs (identifications) which identify various services provided by roadside apparatus 100c. Vehicle 300 reads a service ID, indicating the video distribution service, included in the received service advertisement message, thereby determining that roadside apparatus 100c provides the road video distribution service.

When vehicle 300 reads the service ID indicating the video distribution service, vehicle 300 confirms the connection of the millimeter wave communication with roadside apparatus 100c (S3).

When vehicle 300 confirms the connection of the millimeter wave communication, vehicle 300 transmits a service application message including a service ID corresponding to the video distribution service to roadside apparatus 100c in order to apply for the video distribution service to roadside apparatus 100c (S4).

When roadside apparatus 100c receives the service application message, roadside apparatus 100c transmits a video distribution message including the camera ID, installation position, and shooting direction of the at least one roadside camera 200 installed at intersection 900 (S5). In the example of FIG. 1, roadside apparatus 100c transmits a video distribution message including camera IDs, installation positions, and shooting directions of four cameras (roadside cameras 200a to 200d). The video distribution message will be described in detail in the description regarding FIG. 6.

Vehicle 300 determines the camera ID of roadside camera 200 shooting (in other words, capturing a video of) the road on which a blind spot may occur based on the following: the installation positions and shooting directions of roadside cameras 200 included in the received video distribution message, the position information of vehicle 300, and the direction in which vehicle 300 is going to travel (S6). For example, during a process of a right turn from road 910 to road 980, vehicle 300 illustrated in FIG. 1 determines the camera ID of roadside camera 200d shooting road 930, on which a blind spot may occur. Vehicle 300 may acquire position information of vehicle 300 by using the Global Positioning System (GPS). Vehicle 300 may acquire the direction in which vehicle 300 is going to travel by using the signal of the direction indicator.

For requesting the distribution of the road video corresponding to the determined camera ID, vehicle 300 transmits a video distribution request message including the determined camera ID to roadside apparatus 100c (S7).

Roadside apparatus 100c transmits a video signal including video data from roadside camera 200 corresponding to the camera ID included in the received video distribution request message to vehicle 300 (S8). For example, roadside apparatus 100c transmits to vehicle 300 a video signal including video data from roadside camera 200d.

For cancelling the video distribution service, vehicle 300 transmits a service cancellation message including the service ID corresponding to the video distribution service to roadside apparatus 100c (S9). For example, vehicle 300 may transmit the service cancellation message to roadside apparatus 100c when vehicle 300 completes the right turn (for example, when the direction indicator indicating the right turn is turned off).

Figure 7A:
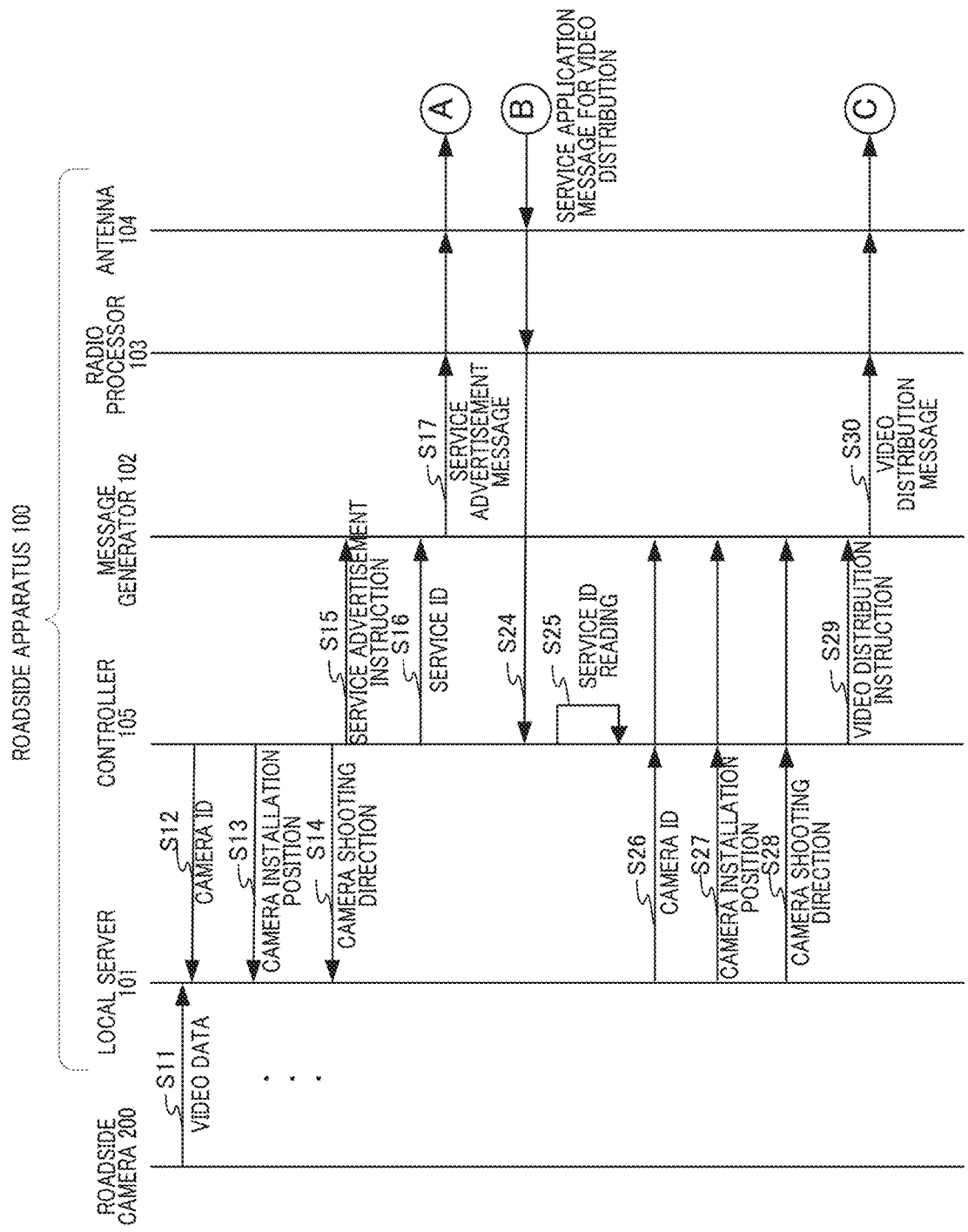
FIG. 7A is a sequence diagram illustrating an exemplary operation of the road-vehicle cooperation driving assistance system.
Figure 7B:
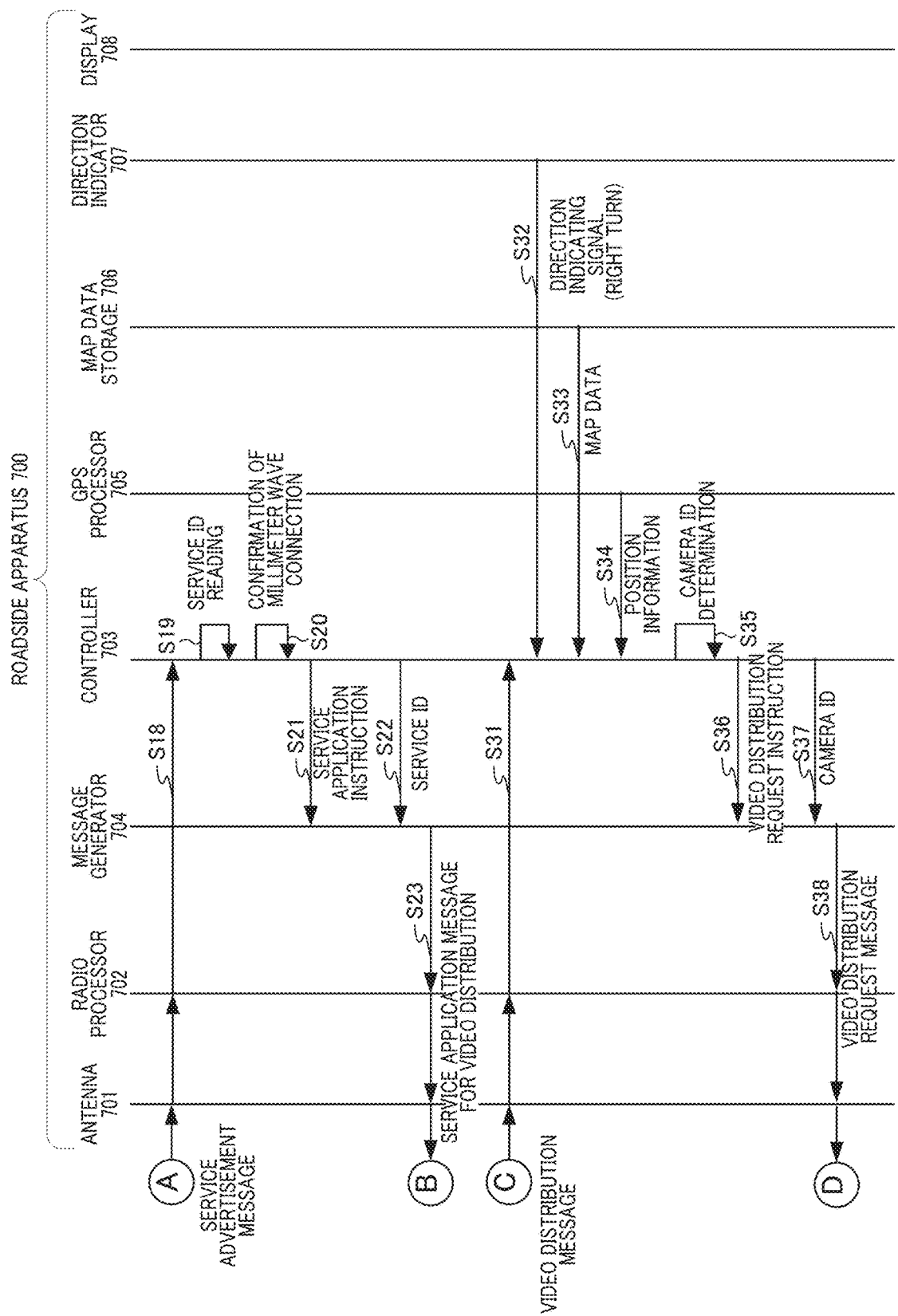
FIG. 7B is a sequence diagram illustrating the exemplary operation of the road-vehicle cooperation driving assistance system.

As described in S20 of FIG. 7B, vehicle 300 may omit the confirmation of the millimeter wave connection in S3.

Figure 3:
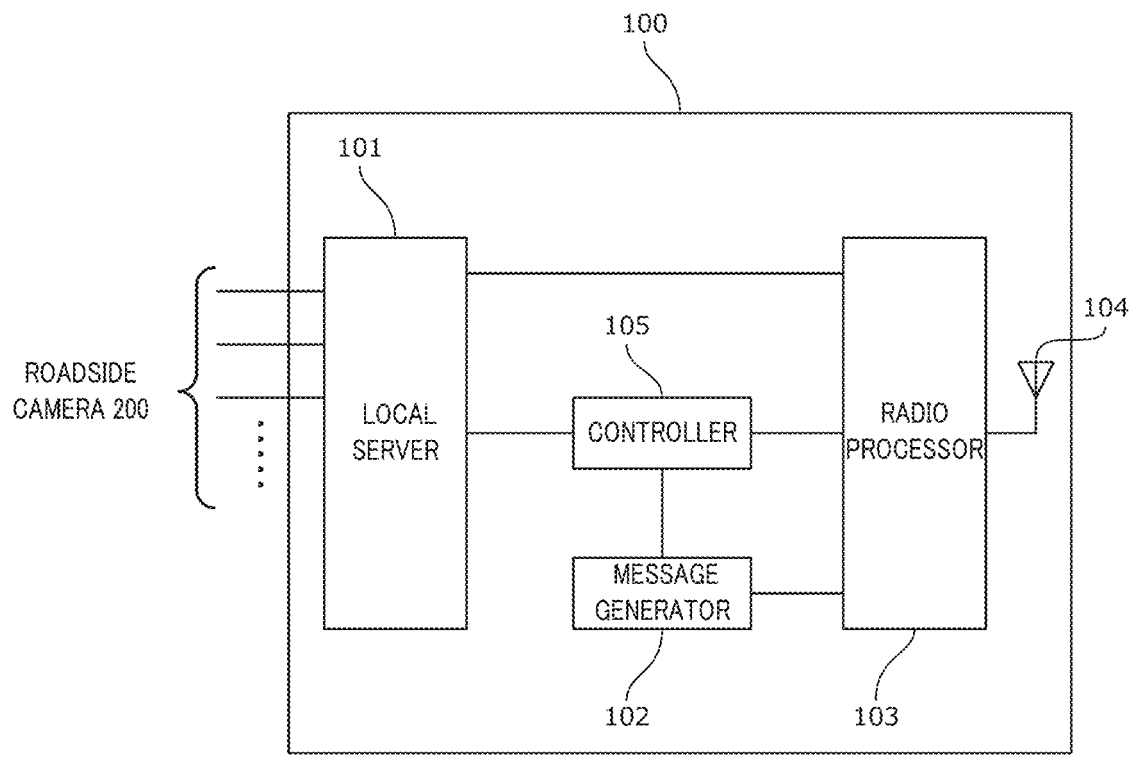
FIG. 3 illustrates an exemplary block configuration of a roadside apparatus.

FIG. 3 illustrates an exemplary block configuration of roadside apparatus 100. Roadside apparatus 100 includes local server 101, message generator 102, radio processor 103, antenna 104, and controller 105. Roadside apparatus 100 is connected to one or more roadside cameras 200.

Local server 101 receives video data transmitted from roadside cameras 200. Local server 101 stores information regarding each roadside camera 200 such as the camera ID, camera installation position, and shooting direction, and associates the received video data with the information regarding roadside camera 200 that have transmitted the video data. Local server 101 transmits the video signal including the video data to an in-vehicle apparatus via radio processor 103.

Message generator 102 generates a service advertisement message and a video distribution message. The service advertisement message includes the service ID corresponding to the video distribution service. The video distribution message includes information regarding each roadside camera 200 such as the ID, installation position, and shooting direction of the camera. Message generator 102 transmits the generated service advertisement message and video distribution message to the in-vehicle apparatus via radio processor 103.

Radio processor 103 performs radio communication by using millimeter waves via antenna 104. Radio processor 103 may use microwaves for transmitting the service advertisement message.

Controller 105 controls the entire roadside apparatus 100. Controller 105 may include a processor such as a central processing unit (CPU) or a digital signal processor (DSP).

Controller 105 may implement a predetermined function, for example, according to a program stored in a storage device. For example, controller 105 assigns a camera ID to each roadside camera 200. Controller 105 stores, in local server 101, the camera ID and the information regarding the installation position, and shooting direction of roadside camera 200 having the camera ID. Controller 105 associates the video data transmitted from local server 101 with information (camera ID, installation position, and shooting direction) regarding roadside camera 200. Controller 105 instructs message generator 102 to generate a service advertisement message and a video distribution message. Controller 105 executes video distribution start processing and video distribution end processing.

Figure 4:
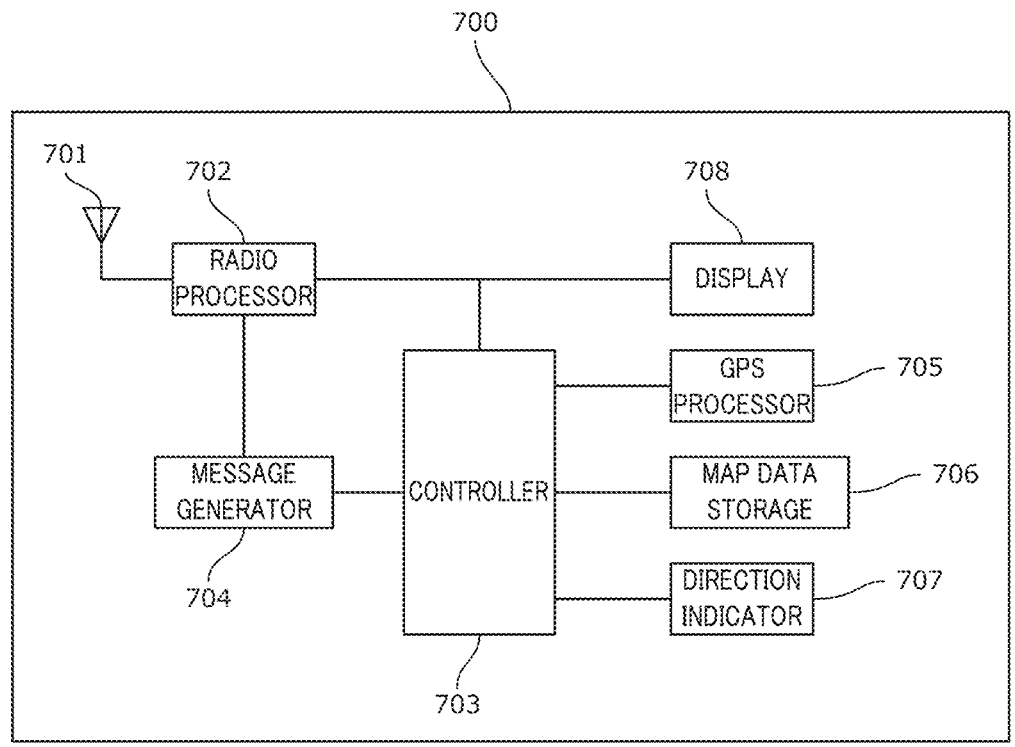
FIG. 4 illustrates an exemplary block configuration of an in-vehicle apparatus.

FIG. 4 illustrates an exemplary block configuration of in-vehicle apparatus 700. In-vehicle apparatus 700 includes antenna 701, radio processor 702, controller 703, message generator 704, GPS processor 705, map data storage 706, direction indicator 707, and display 708.

Radio processor 702 performs radio communication by using millimeter waves via antenna 701. Radio processor 702 may use microwaves for receiving the service advertisement message.

Controller 703 controls the entire in-vehicle apparatus 700. Controller 703 may include a processor such as a CPU or a DSP.

Controller 703 may implement a predetermined function, for example, according to a program stored in a storage device. For example, controller 703 determines the camera ID of roadside camera 200 shooting the road on which a blind spot may occur based on the following: the installation positions and shooting directions of the cameras included in the received video distribution message, the position information of vehicle 300 acquired by GPS processor 705, map data stored in map data storage 706, and a state of direction indicator 707. Controller 703 instructs message generator 704 to generate a service application message, a video distribution request message, and a service cancellation message.

Message generator 704 generates the service application message and the video distribution request message. The service application message includes the service ID corresponding to the video distribution service. The video distribution request message includes the camera ID of roadside camera 200 for which the video distribution is requested. Message generator 704 transmits the generated service application message and video distribution request message to roadside apparatus 100.

GPS processor 705 receives a GPS signal transmitted from a GPS satellite and acquires the current position of vehicle 300.

Map data storage 706 stores map data such as terrain information, road centerline information, and road edge information.

Direction indicator 707 informs whether vehicle 300 is in the process of right or left turn.

Display 708 displays video data received from roadside apparatus 100 via radio processor 702.

Figures 5, 6:
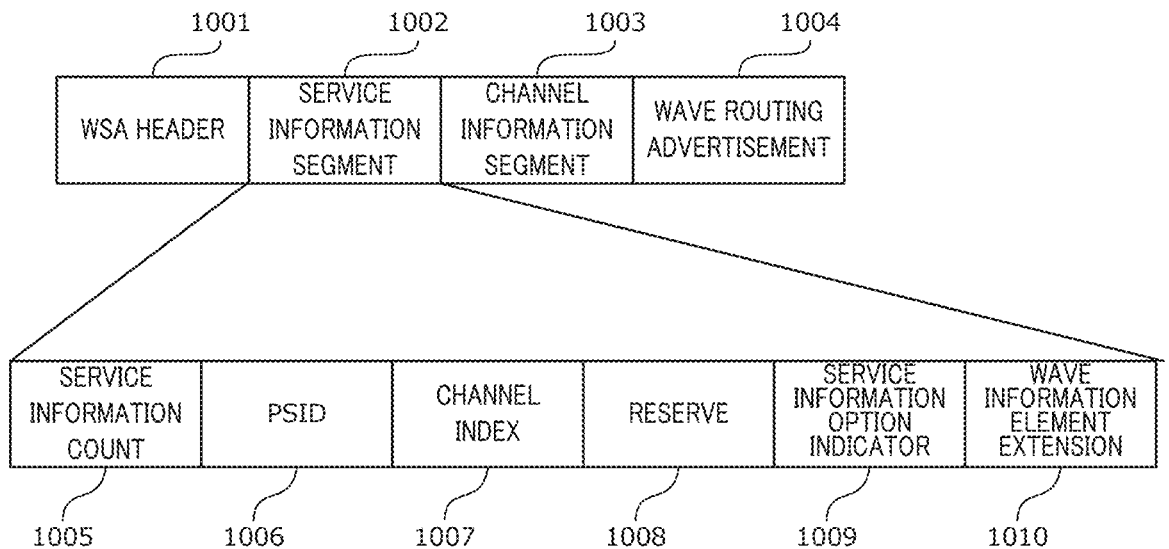
FIG. 5 illustrates a format of WSA.
FIG. 6 is a diagram for explaining exemplary elements included in a video distribution message.

FIG. 5 illustrates a format of WSA. The format of WSA illustrated in FIG. 5, for example, may be used for the service advertisement message transmitted by roadside apparatus 100 to in-vehicle apparatus 700. As illustrated in FIG. 5, WSA includes fields of WSA header 1001, service information segment 1002, channel information segment 1003, and WAVE routing advertisement 1004.

Service information segment 1002 includes fields of service information count 1005, Provider Service Identifier (PSID) 1006, channel index 1007, reserve 1008, service information option indicator 1009, and WAVE information element extension 1010.

PSID 1006 is a service ID represented by an integer from 0 to 270549119 according to the service. PSID 1006 is assigned to an organization authorized to use the PSID. Therefore, a value that has not yet been associated with any service and has not been assigned to any organization is assigned to the PSID of the road video distribution service.

FIG. 6 is a diagram for explaining exemplary elements included in a video distribution message. The video distribution message transmitted by roadside apparatus 100 to in-vehicle apparatus 700 includes elements of the ID, installation position, and shooting direction of a camera as illustrated in FIG. 6.

The "camera ID" is a unique ID that identifies roadside camera 200.

The "camera installation position" indicates the installation position of roadside camera 200. The camera installation position may be indicated by latitude and longitude, for example.

The "shooting direction of camera" indicates the shooting direction of roadside camera 200. The shooting direction may be indicated by absolute azimuth angles, for example, with roadside camera 200 as a reference, with due north at 0 degrees or 360 degrees, due east at 90 degrees, due south at 180 degrees, and due west at 270 degrees.

The video distribution message transmitted by roadside apparatus 100 to in-vehicle apparatus 700 includes the elements of all the roadside cameras 200 capturing the road videos to be distributed by roadside apparatus 100. In the example of FIG. 1, for example, the video distribution message transmitted by roadside apparatus 100 to in-vehicle apparatus 700 includes the elements of roadside camera 200*a*, the elements of roadside camera 200*b*, the elements of roadside camera 200*c*, and the elements of roadside camera 200*d*.

FIGS. 7A to 7D are sequence diagrams illustrating the exemplary operation of the road-vehicle cooperation driving assistance system. The circled A, B, and C in FIG. 7A lead to the circled A, B, and C in FIG. 7B. The circled D in FIG. 7B leads to the circled D in FIG. 7C. The circled E and F in FIG. 7C lead to the circled E and F in FIG. 7D.

Roadside cameras 200 transmit captured video data to local server 101 (S11). Local server 101 receives the video data transmitted from roadside cameras 200.

Controller 105 sets a different camera ID for each roadside camera 200, associates the installation position, and shooting direction of each roadside camera 200 with the video data received by local server 101, and stores the data in the local server 101 (S12 to S14).

Controller 105 outputs a service advertisement instruction to message generator 102 for advertising to vehicle 300 that the video distribution service is provided (S15).

Controller 105 outputs a service ID (PSID) corresponding to the video distribution service to message generator 102 (S16).

Message generator 102 generates a service advertisement message including the service ID output in S16, and transmits the message to in-vehicle apparatus 700 via radio processor 103 and antenna 104 (S17).

When vehicle 300 enters the communication area of roadside apparatus 100, controller 703 of in-vehicle apparatus 700 illustrated in FIG. 7B receives the service advertisement message via antenna 701 and radio processor 702 (S18). The received service advertisement message includes a service ID indicating that the video distribution service is being provided.

Controller 703 reads the service ID included in the service advertisement message (S19). By reading the service ID of the video distribution service included in the service advertisement message, controller 703 recognizes that the road video distribution service is provided at intersection 900.

When controller 703 receives the service advertisement message of S18 with microwaves, the controller confirms the connection of the millimeter wave communication with roadside apparatus 100 (S20). For example, controller 703 confirms whether or not roadside apparatus 100, the transmission source of the service advertisement message received by using microwaves, matches roadside apparatus 100 connected by using millimeter waves. For example, the matching confirmation can be carried out as follows: controller 703 compares information for identifying roadside apparatus 100 included in a packet, which includes a service advertisement message, with information for identifying roadside apparatus 100 included in a packet, which is used for millimeter wave connection.

Controller 703 may omit the processing of S20 when the service advertisement message is received by using millimeter waves.

In order to apply for the video distribution service to roadside apparatus 100, controller 703 outputs a service application instruction and the service ID read in S19 to message generator 704 (S21, S22).

Message generator 704 generates a service application message including the service ID output in S22, and transmits the message to roadside apparatus 100 via radio processor 702 and antenna 701 (S23). When the service advertisement message is received by using microwaves, radio processor 702 may transmit the service application message by using microwaves.

As illustrated in FIG. 7A, controller 105 of roadside apparatus 100 receives the service application message for video distribution via antenna 104 and radio processor 103 (S24).

Controller 105 reads the service ID included in the service application message (S25). By reading the service ID of the video distribution service included in the service application message, controller 105 recognizes that in-vehicle apparatus 700 has applied for the road video distribution service at intersection 900.

When controller 105 recognizes the application of the video distribution service, controller 105 acquires, from local server 101, the ID, installation position, and shooting direction of the at least one camera stored in local server 101, and outputs the acquired data to message generator 102 (S26, S27, S28). For example, controller 105 acquires data from local server 101 and outputs the acquired data to message generator 102. The acquired data include the ID, installation position, and shooting direction of each of roadside cameras 200a to 200d installed at intersection 900.

For providing vehicle 300 with the content of the video distribution service (the IDs, installation positions, and shooting directions of roadside cameras 200 installed at intersection 900), controller 105 outputs a video distribution instruction to message generator 102 (S29).

In response to the video distribution instruction in S29, message generator 102 generates a video distribution message including the IDs, installation positions, and shooting directions of the cameras output in S26, S27, and S28, and transmits the message to in-vehicle apparatus 700 via radio processor 103 and antenna 104 (S30).

Controller 703 of in-vehicle apparatus 700 illustrated in FIG. 7B receives the video distribution message via antenna 701 and radio processor 702 (S31).

Controller 703 receives a direction indicating signal from direction indicator 707 (S32). For example, when vehicle 300 illustrated in FIG. 1 is in a process of a right turn from road 910 to road 980, controller 703 receives a direction indicating signal indicating the right turn from direction indicator 707.

Controller 703 receives map data from map data storage 706 (S33).

Controller 703 receives the current position information of the vehicle from GPS processor 705 (S34).

Controller 703 determines the camera ID of roadside camera 200 shooting the road on which a blind spot may occur based on the following (S35): the installation positions and shooting directions of roadside cameras 200 included in the video distribution message received in S31, the direction indicated by the direction indicating signal received in S32 (direction in which the vehicle is going), the map data received in S33, and the current position information of the vehicle received in S34.

For example, in the case of vehicle 300 in FIG. 1, controller 703 determines the entrance of vehicle 300 into intersection 900 based on the current position information of vehicle 300 acquired by GPS processor 705 and the map data. In addition, controller 703 determines from the direction indicating signal output from direction indicator 707 that vehicle 300 is about to turn right to road 980.

Based on the installation positions and shooting directions of roadside cameras 200 included in the video distribution message received in S31, controller 703 determines roadside camera 200d shooting road 930 located opposite to road 980, onto which vehicle 300 is to turn right. Controller 703 then determines the camera ID of the determined roadside camera 200d. In this manner, controller 703 determines the camera ID of roadside camera 200d shooting road 930, on which a blind spot from the right-turning vehicle 300 may occur.

When there are a plurality of roads on which blind spots may occur, controller 703 may determine a plurality of camera IDs.

In addition, for example, when vehicle 500 illustrated in FIG. 1 is in a process of a left turn to road 940, the road on which a blind spot may occur is road 950, which is the oncoming lane ahead of vehicle 500. Therefore, in-vehicle apparatus 700 to be mounted in vehicle 500 may determine the camera IDs of roadside cameras 200a and 200b as the camera IDs of roadside cameras 200 shooting roads 950 and 970, on which blind spots may occur when vehicle 500 is in a process of a left turn.

Controller 703 outputs a video distribution request instruction and the determined camera ID to message generator 704 for requesting distribution of the video corresponding to the determined camera ID (S36, S37).

Message generator 704 generates a video distribution request message including the camera ID output in S35 in response to the video distribution request instruction in S36, and transmits the message to roadside apparatus 100 via radio processor 702 and antenna 701 (S38). When the service advertisement message is received by using microwaves, radio processor 702 may transmit the video distribution request message by using microwaves.

Figure 7C:
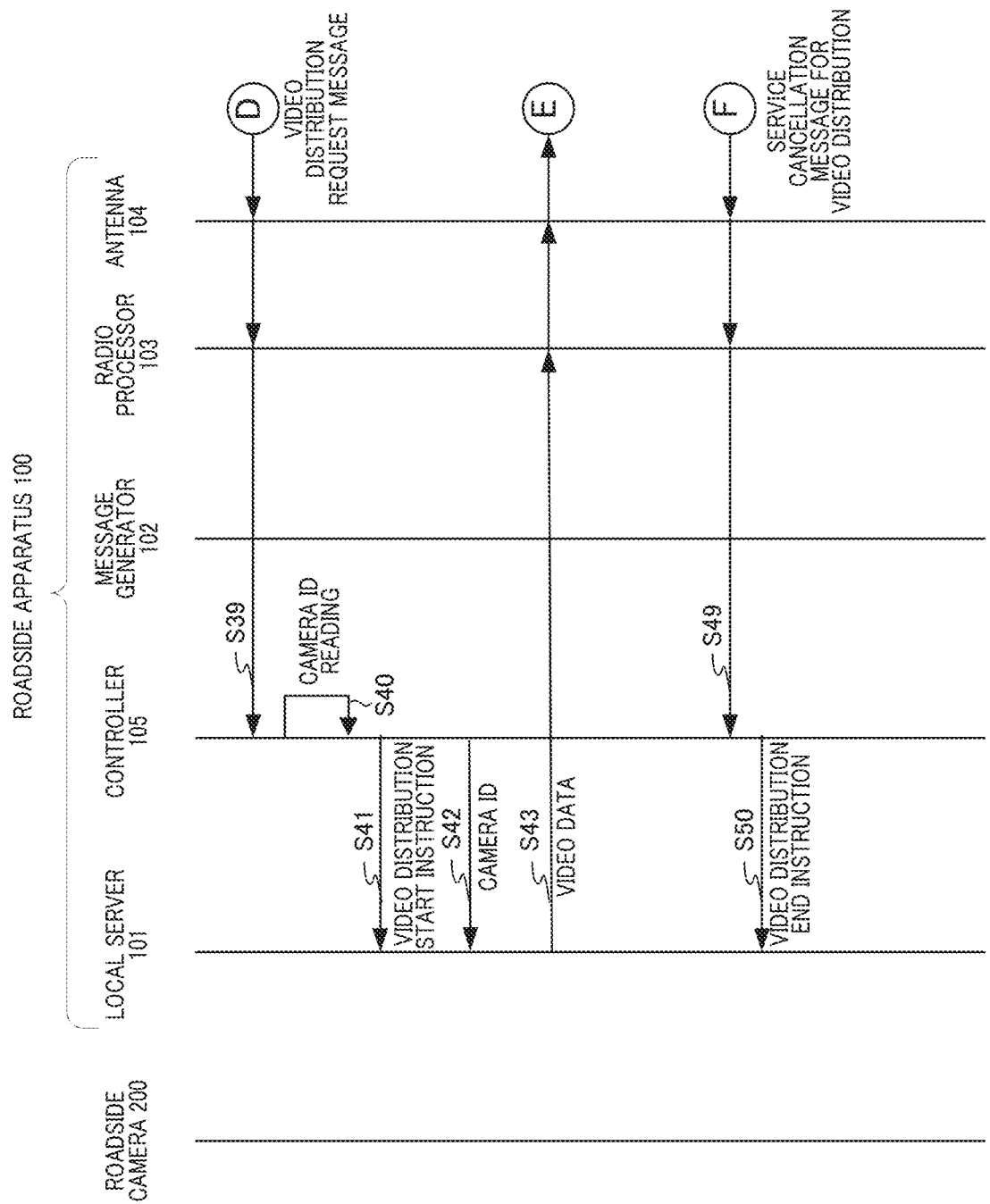
FIG. 7C is a sequence diagram illustrating the exemplary operation of the road-vehicle cooperation driving assistance system.

As illustrated in FIG. 7C, controller 105 of roadside apparatus 100 receives the video distribution request message via antenna 104 and radio processor 103 (S39).

Controller 105 reads the camera ID included in the video distribution request message received in S39 (S40).

Controller 105 outputs a video distribution start instruction and the camera ID read in S40 to local server 101 (S41, S42).

Local server 101 transmits a video signal including video data corresponding to the camera ID output in S42 to in-vehicle apparatus 700 via radio processor 103 and antenna 104 (S43). Radio processor 103 transmits the video signal by using millimeter waves. The video distribution may be transmitted according to a protocol such as Real Time Streaming Protocol (RTSP) or Real-time Transport Protocol (RTP).

Figure 7D:
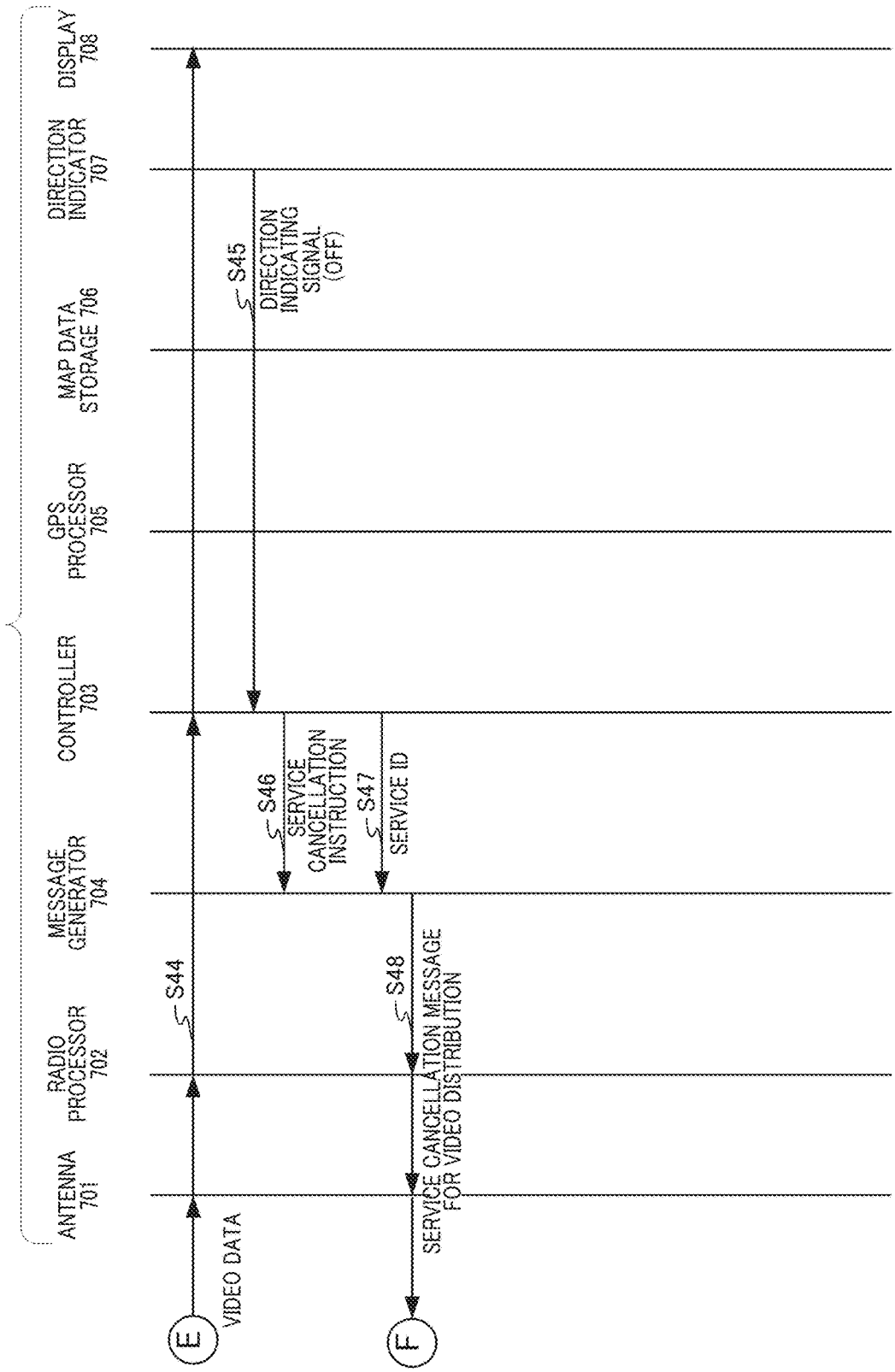
FIG. 7D is a sequence diagram illustrating the exemplary operation of the road-vehicle cooperation driving assistance system.

As illustrated in FIG. 7D, display 708 of in-vehicle apparatus 700 receives the video signal via antenna 701, radio processor 702, and controller 703, and displays the road video (S44). For example, display 708 displays a road video captured by roadside camera 200d.

Direction indicator 707 outputs a direction indicating signal to controller 703 (S45). For example, when vehicle 300 illustrates in FIG. 1 completes a right turn onto road 980, direction indicator 707 outputs an off-state direction indicating signal to control unit 703.

When controller 703 receives the off-state direction indicating signal from direction indicator 707, controller 703 outputs a service cancellation instruction and the service ID of the video distribution service to be canceled to message generator 704, for cancelling the video distribution service (S46, S47).

Message generator 704 generates a service cancellation message including the service ID output in S47 in response to the service cancellation instruction in S46, and transmits the message to roadside apparatus 100 via radio processor 702 and antenna 701 (S48). When the service advertisement message is received by using microwaves, radio processor 702 may transmit the service cancellation message by using microwaves.

As illustrated in FIG. 7C, controller 105 of roadside apparatus 100 receives the service cancellation message via antenna 104 and radio processor 103 (S49).

When controller 105 receives the service cancellation message in S49, the controller outputs a video distribution end instruction to local server 101 (S50). Local server 101 ends the transmission of the video signal in response to the video distribution end instruction in S50.

As described above, roadside apparatus 100 includes radio processor 103 and message generator 102. Radio processor 103 transmits a service advertisement message indicating the provision of a road video distribution service and receives a service application message indicating transmission request of the road video from in-vehicle apparatus 700. Message generator 102, based on the receipt of the service application message, generates a video distribution message including the ID, installation position, and shooting direction of roadside camera 200 capturing the road video, and transmits the message to in-vehicle apparatus 700 via radio processor 103.

In-vehicle apparatus 700 includes radio processor 702 and message generator 704. Radio processor 702 receives, from roadside apparatus 100 providing the road video distribution service, a service advertisement message indicating that the road video distribution service is provided. Message generator 704 generates, based on the receipt of the service advertisement message, the service application message indicating transmission request of the road video to be transmitted to roadside apparatus 100. Radio processor 702 further transmits the service application message to roadside apparatus 100.

This configuration allows in-vehicle apparatus 700 to recognize that roadside apparatus 100 is providing a road video distribution service by receiving the service advertisement message, which indicates the provision of a road video distribution service and is transmitted from roadside apparatus 100. In-vehicle apparatus 700 thus can receive the road video distribution service.

In addition, roadside apparatus 100 transmits a video signal to in-vehicle apparatus 700 by using millimeter wave communication. This configuration allows in-vehicle apparatus 700 to receive a high-quality video signal, for example, with a resolution of 1920×1080 pixels, a frame rate of 30 fps, and a color space of RGB24.

In-vehicle apparatus 700 determines the camera ID of roadside camera 200 shooting a road that is blind from the vehicle based on the position of the vehicle, the direction in which the vehicle is going to travel, map data, and installation positions and shooting directions of the cameras. Even when the directivity of millimeter wave communication limits the target roadside apparatus 100 for radio communication, this configuration allows in-vehicle apparatus 700 to receive, from roadside apparatus 100 performing the millimeter wave communication, a road video captured by roadside camera 200 shooting the blind road.

Roadside apparatus 100 may use microwave communication for transmission of a service advertisement message. This configuration allows the service advertisement message to be transmitted to a wider communication area than when transmitted by using millimeter wave communication.

Variation 1

FIG. 8 illustrates a variation of the elements included in the video distribution message. The video distribution message may further include an intersection ID, a lane ID, and a Uniform Resource Locator (URL) in addition to the elements illustrated in FIG. 6.

The intersection ID is a unique ID that identifies intersection 900 where roadside apparatuses 100 and roadside cameras 200 are installed. The intersection ID is also included in map data stored in map data storage 706 of in-vehicle apparatus 700. For example, intersection 900 on the map data is associated with the intersection ID assigned to intersection 900.

As roadside apparatus 100 adds the intersection ID to the video distribution message, in-vehicle apparatus 700 can reduce erroneous selection of the camera ID of roadside camera 200. For example, when vehicle 300 illustrated in FIG. 1 enters intersection 900, in-vehicle apparatus 700 compares the intersection ID included in the received video distribution message with the intersection ID corresponding to intersection 900 included in the map data. If the intersections IDs are not the same, in-vehicle apparatus 700 discards the received video distribution message and does not determine the camera ID. This configuration allows in-vehicle apparatus 700 to reduce erroneous selection of the camera ID.

The lane ID is a unique ID that identifies the lane shot by roadside camera 200. The lane ID is also included in the map data stored in map data storage 706 of in-vehicle apparatus 700. For example, road 910 on the map data is associated with the lane ID assigned to road 910.

As roadside apparatus 100 adds the lane ID to the video distribution message, in-vehicle apparatus 700 can reduce erroneous selection of the camera ID of roadside camera 200. For example, in-vehicle apparatus 700 acquires the lane ID of a road on which a blind spot may occur, and determines the camera ID of roadside camera 200 shooting the road with the acquired lane ID. This configuration allows in-vehicle apparatus 700 to reduce erroneous selection of the camera ID.

A URL indicates an access destination of video data in local server 101. In-vehicle apparatus 700 transmits an HTTP request to the URL included in the video distribution message, and roadside apparatus 100 returns the video of the specified URL as an HTTP response. This configuration allows in-vehicle apparatus 700 to display the road video on a web browser.

When in-vehicle apparatus 700 receives video data by using a URL, in-vehicle apparatus 700 does not have to transmit the video distribution request message in S38 of FIG. 7B to roadside apparatus 100. In other words, in-vehicle apparatus 700 may transmit the URL corresponding to the determined camera ID to roadside apparatus 100 in place of the video distribution request message of S38.

In addition, roadside apparatus 100 may omit transmission of the installation positions and shooting directions of the cameras, the intersection ID, and the URL. For example, roadside apparatus 100 may transmit a video distribution message including the camera ID and the lane ID to in-vehicle apparatus 700.

Variation 2

FIG. 9 is a diagram for explaining a variation of the method for setting the shooting direction of a camera in the description for FIGS. 6 and 8. In FIG. 9, the same components as in FIG. 1 are given the same reference numerals.

With the installation position of the roadside apparatus 100 as a reference, roadside apparatus 100 assigns numbers to the roads forming intersection 900 according to a predetermined rule. For example, roadside apparatus 100c illustrated in FIG. 9 assigns number 0 to the road on which roadside apparatus 100c is installed as a reference, and assigns numbers 1, 2, and 3 clockwise to the other roads forming intersection 900. Roadside apparatus 100d assigns number 0 (indicated in parentheses in FIG. 9) to the road on which roadside apparatus 100d is installed as a reference, and assigns numbers 1, 2, and 3 (indicated in parentheses in FIG. 9) clockwise to the other roads forming intersection 900.

With the road on which roadside apparatus 100 is installed as a reference, roadside apparatus 100 indicates the shooting direction of roadside camera 200 by a number attached to the road shot by the camera. As illustrated in FIG. 9, for example, roadside apparatus 100c assigns the number 0 without parentheses to the road, on which roadside apparatus 100c is installed, therefore indicates the shooting direction of roadside camera 200d by the number "3" without parentheses. Roadside apparatus 100c indicates the shooting direction of roadside camera 200a by the number "0" without parentheses. Roadside apparatus 100c indicates the shooting direction of roadside camera 210b by the number "1" without parentheses. Roadside apparatus 100c indicates the shooting direction of roadside camera 220c by the number "2" without parentheses. Roadside apparatus 100c transmits a video distribution message including the camera IDs of roadside cameras 200 and the shooting directions (the numbers assigned to the roads) of roadside cameras 200 corresponding to the respective camera IDs.

In a similar manner, for example, roadside apparatus 100d assigns the number 0 with parentheses to the road, on which roadside apparatus 100d is installed, therefore indicates the shooting direction of roadside camera 200a by the number "3" with parentheses as illustrated in FIG. 9. Roadside apparatus 100d indicates the shooting direction of roadside camera 200b by the number "0" with parentheses. Roadside apparatus 100d indicates the shooting direction of roadside camera 210c by the number "1" with parentheses. Roadside apparatus 100d indicates the shooting direction of roadside camera 200d by the number "2" with parentheses. Roadside apparatus 100d transmits a video distribution message including the camera IDs of roadside cameras 200 and the shooting directions (the numbers assigned to the roads) of roadside cameras 200 corresponding to the respective camera IDs.

In-vehicle apparatus 700 recognizes in advance the rule of the shooting directions of roadside cameras 200. Therefore, for example, when a vehicle is in a process of a right turn at crossroads intersection 900 illustrated in FIG. 9, in-vehicle apparatus 700 may determine the ID of the camera shooting the road of number 3 as a camera shooting a road on which a blind spot may occur. In addition, for example, when a vehicle is in a process of a left turn at crossroads intersection 900 illustrated in FIG. 9, in-vehicle apparatus 700 may determine the ID of the camera shooting the road of number 0 as a camera shooting a road on which a blind spot may occur.

As described above, the shooting direction of roadside cameras 200 may be indicated by a number assigned to the road according to a predetermined rule, with the installation position of the roadside apparatus 100 as a reference. This configuration allows in-vehicle apparatus 700 to reduce the amount of calculation required to determine the camera ID, thus allows speedy determination of the camera ID.

Variation 3

Roadside apparatus 100 may collectively transmit a service advertisement message and a video distribution message by adding the elements of the video distribution message illustrated in FIG. 6 or FIG. 8 to the field of WAVE information element extension 1010 in the format of WSA illustrated in FIG. 5. In this case, in-vehicle apparatus 700 may collectively transmit a service application message and a video distribution request message, or may separately transmit the service application message and the video distribution request message.

FIGS. 10A to 10D are sequence diagrams illustrating an exemplary operation of a road-vehicle cooperation driving assistance system in variation 3. In FIGS. 7A to 7D, roadside apparatus 100 separately transmits the service advertisement message and the video distribution message. In FIGS. 10A to 10D, roadside apparatus 100 collectively transmits the service advertisement message and the video distribution message.

Figure 10A:
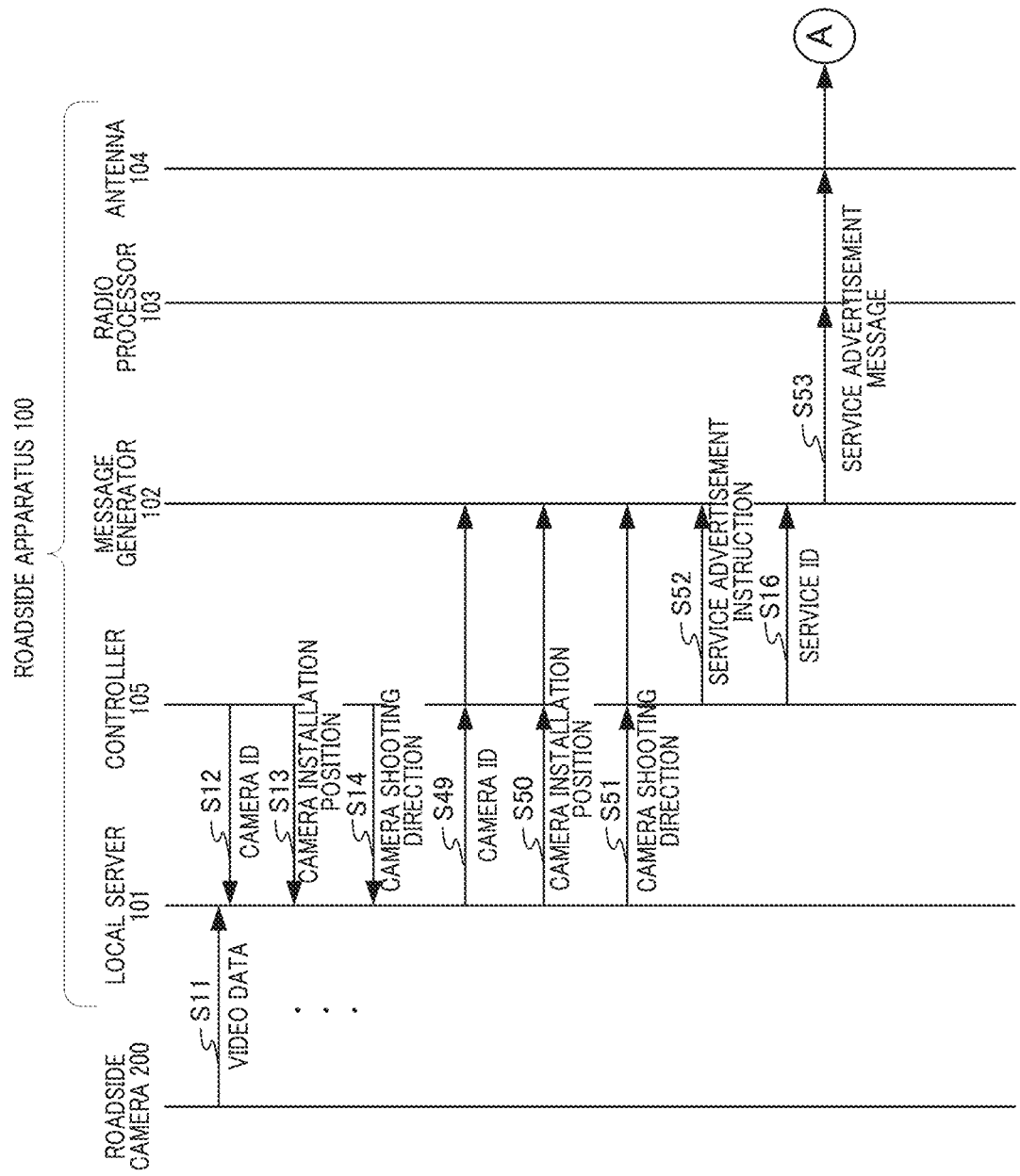
FIG. 10A is a sequence diagram illustrating a variation of the operation of the road-vehicle cooperation driving assistance system.
Figure 10B:
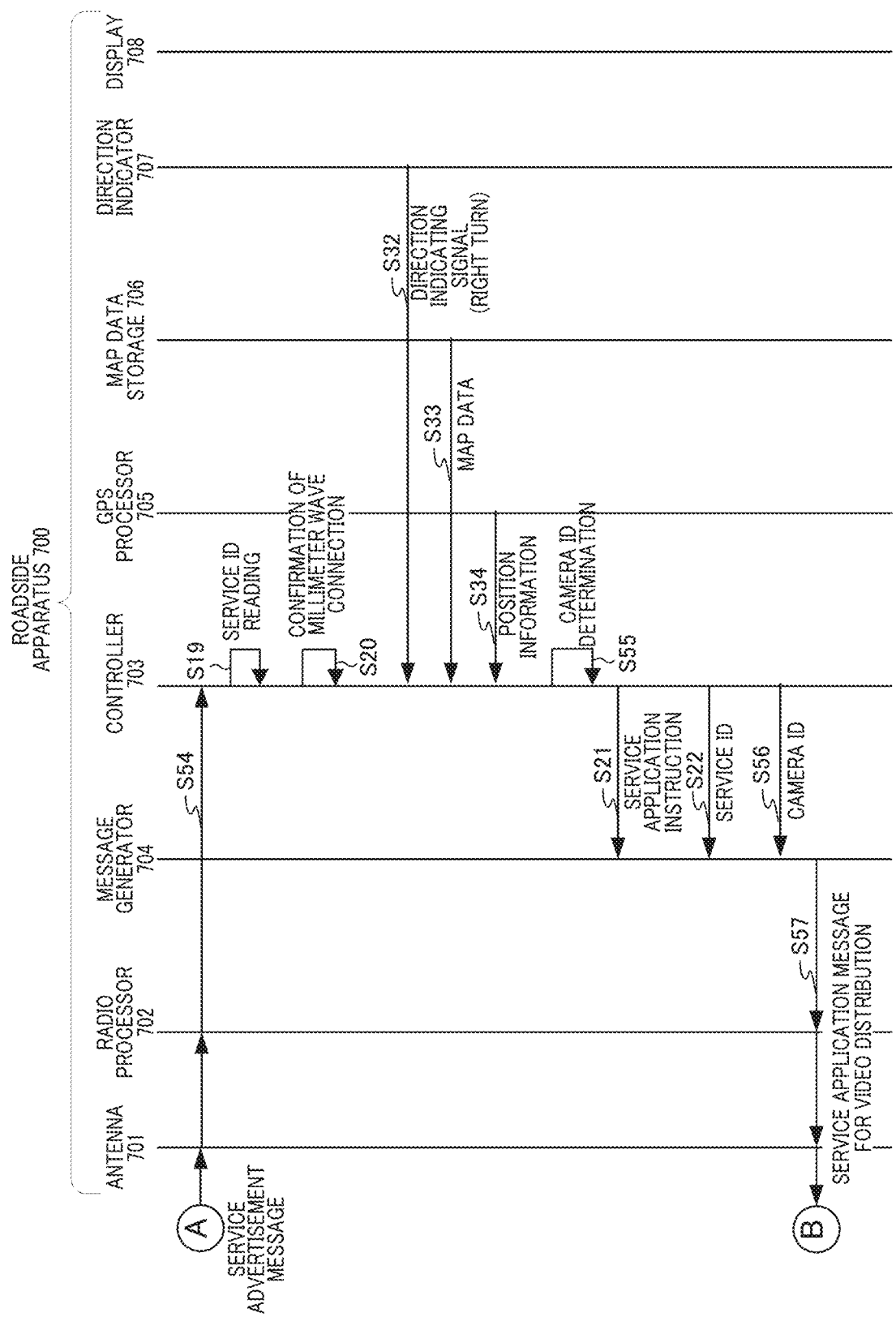
FIG. 10B is a sequence diagram illustrating the variation of the operation of the road-vehicle cooperation driving assistance system.

The circled A in FIG. 10A leads to the circled A in FIG. 10B. The circled B in FIG. 10B leads to the circled B in FIG. 10C. The circled E and F in FIG. 10C lead to the circled E and F in FIG. 10D. Descriptions of parts the same as those in FIGS. 7A to 7D are omitted.

After S14, controller 105 in roadside apparatus 100 illustrated in FIG. 10A acquires, from local server 101, the ID, installation position, and shooting direction of the at least one camera stored in local server 101, and outputs the acquired data to message generator 102 (S49, S50, S51). For example, controller 105 acquires data from local server 101 and outputs the acquired data to message generator 102. The acquired data include the ID, installation position, and shooting direction of each of roadside cameras 200a to 200d installed at intersection 900.

Controller 105 outputs a service advertisement instruction to message generator 102 for advertising the following to vehicle 300: the content of the video distribution service (the IDs, installation positions, and shooting directions of roadside cameras 200 installed at intersection 900); and that the video distribution service is provided (S52).

Message generator 102 generates a service advertisement message including the IDs, installation positions, and shooting directions of the cameras output in S49, S50, and S51, and the service ID output in S16, and transmits the message to in-vehicle apparatus 700 via radio processor 103 and antenna 104 (S53).

When vehicle 300 enters the communication area of roadside apparatus 100, controller 703 of in-vehicle apparatus 700 illustrated in FIG. 10B receives the service advertisement message via antenna 701 and radio processor 702 (S54). The received service advertisement message includes the following: a service ID indicating that the video distribution service is being provided; and the content of the video distribution service (the IDs, installation positions, and shooting directions of roadside cameras 200 installed at intersection 900).

When controller 703 receives the service advertisement message of S54 with microwaves, the controller confirms the connection of the millimeter wave communication with roadside apparatus 100 (S20).

Controller 703 determines the camera ID of roadside camera 200 shooting a road on which a blind spot may occur based on the following (S55): the installation positions and shooting directions of roadside cameras 200 included in the service advertisement message received in S54, the direction indicated by the direction indicating signal received in S32 (direction in which the vehicle is going), map data received in S33, and the current position information of the vehicle received in S34.

In order to apply for the video distribution service to roadside apparatus 100, controller 703 outputs a service application instruction, the service ID read in S19, and the camera ID determined in S55 to message generator 704 (S21, S22, S56).

Message generator 704 generates a service application message including the service ID output in S22 and the camera ID output in S56, and transmits the message to roadside apparatus 100 via radio processor 702 and antenna 701 (S57). When the service advertisement message is received by using microwaves, radio processor 702 may transmit the service application message by using microwaves.

Figure 10C:
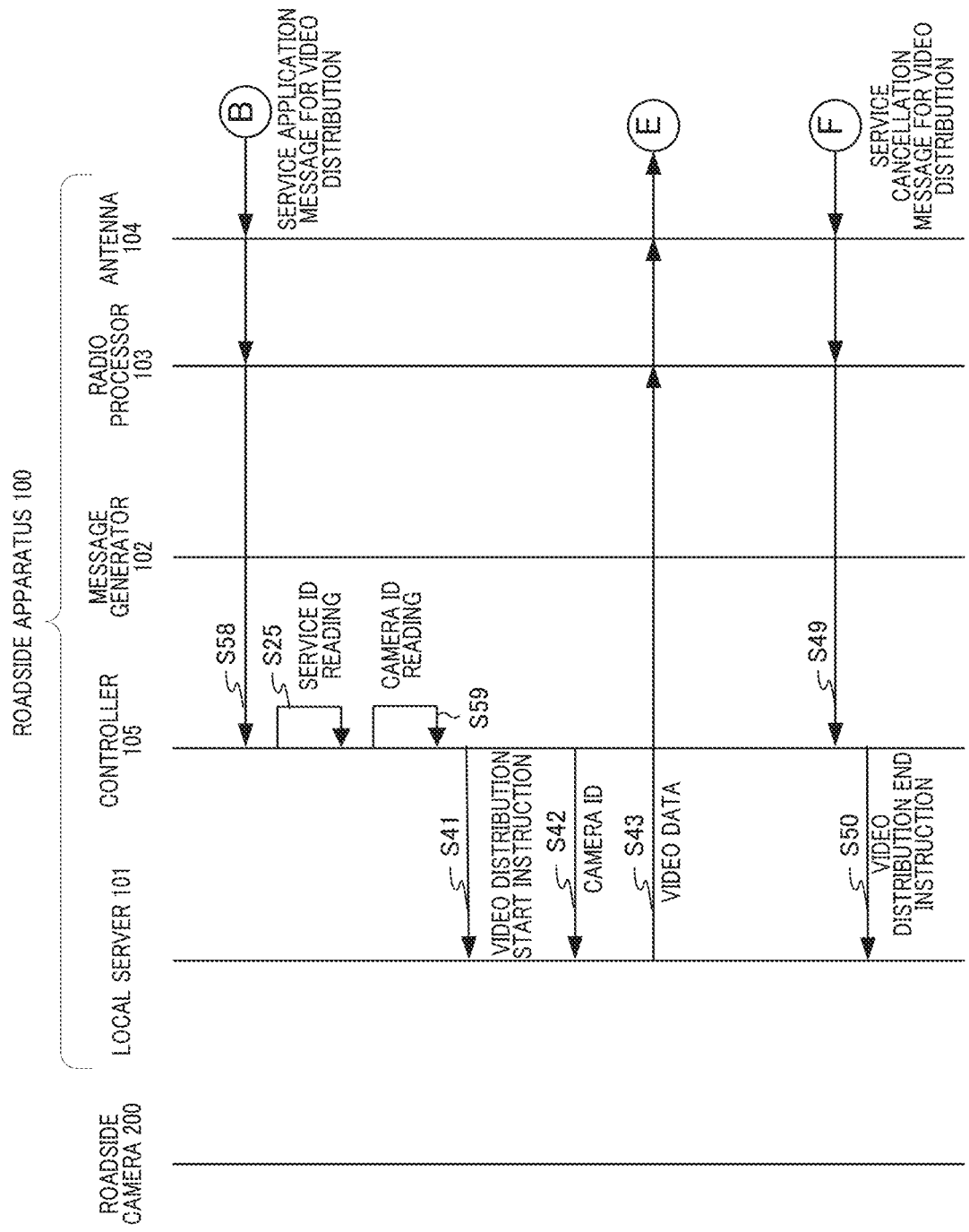
FIG. 10C is a sequence diagram illustrating the variation of the operation of the road-vehicle cooperation driving assistance system.

Controller 105 in roadside apparatus 100 illustrated in FIG. 10C receives the service application message for video distribution via antenna 104 and radio processor 103 (S58).

Controller 105 reads the service ID and the camera ID included in the service application message (S25, S59). By reading the service ID of the video distribution service included in the service application message, controller 105 recognizes that in-vehicle apparatus 700 has applied for the road video distribution service at intersection 900.

Controller 105 outputs a video distribution start instruction and the camera ID read in S59 to local server 101 (S41, S42).

Figure 10D:
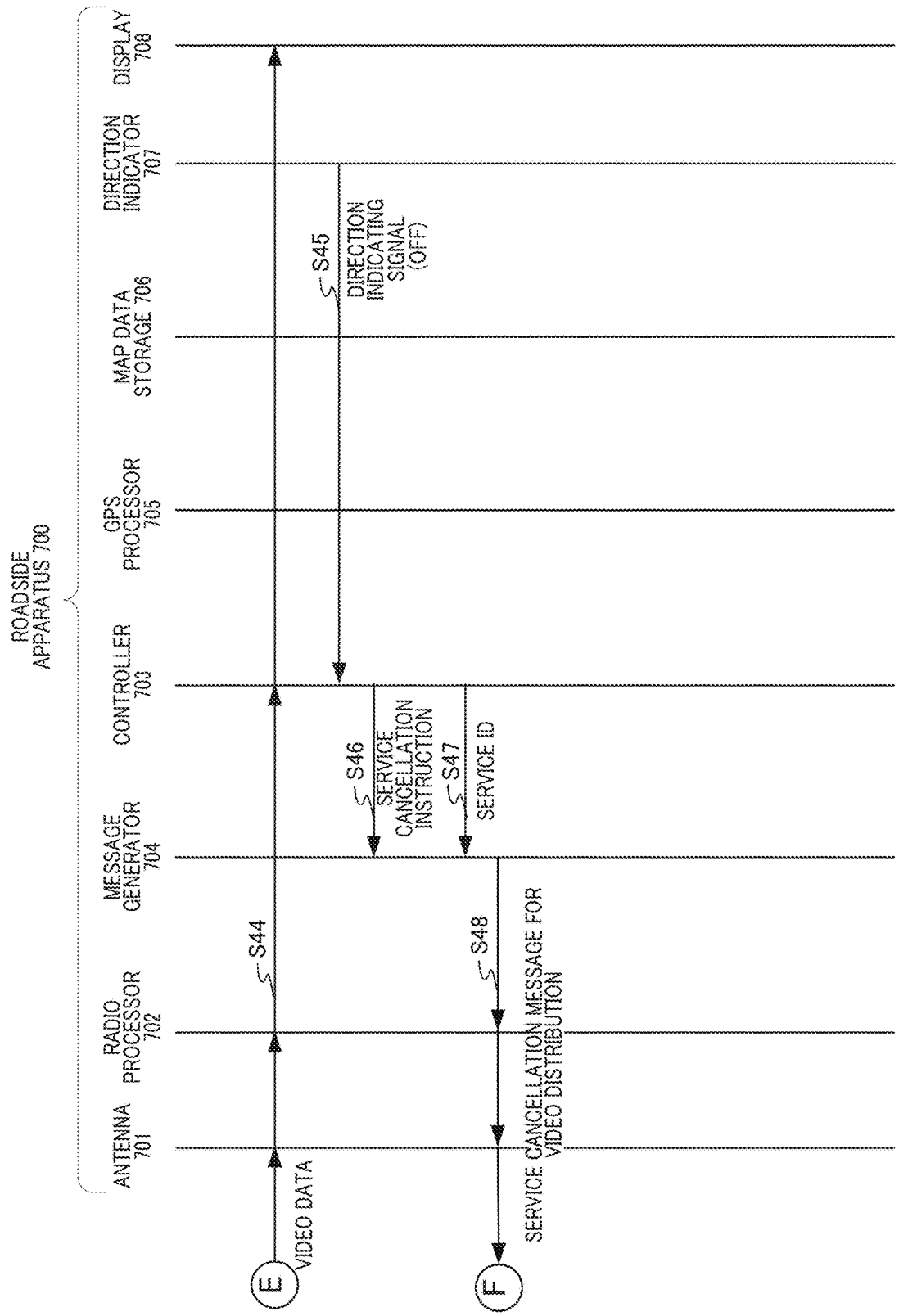
FIG. 10D is a sequence diagram illustrating the variation of the operation of the road-vehicle cooperation driving assistance system.

The processing after S44 in FIG. 10D is the same as that in FIG. 7D, thus the description thereof is omitted.

As described above, roadside apparatus 100 may collectively transmit a service advertisement message and a video distribution message, and in-vehicle apparatus 700 may collectively transmit a service application message and a video distribution request message.

This configuration reduces the number of times signals are exchanged between in-vehicle apparatus 700 and roadside apparatus 100 during the period after the in-vehicle apparatus receives the service advertisement message and before the in-vehicle apparatus receives the video signal. The in-vehicle apparatus thus can receive the video signal more quickly.

In the above-described embodiments, the expressions "processor," "-er," "-or," and "-ar" used for the component elements may be replaced with other expressions such as "circuit (circuitry)," "assembly," "device," "unit," or "module."

The description has been given of embodiments with reference to the accompanying drawings, but the present disclosure is not limited to the embodiments. It is apparent that variations or modifications in the category recited in the claims may be conceived of by a person skilled in the art. It is to be understood that such variations or modifications also fall within the technical scope of the present disclosure. In addition, the component elements in the embodiments may be optionally combined without departing from the spirit of the present disclosure.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

SUMMARY OF THE PRESENT DISCLOSURE

An in-vehicle apparatus according to the present disclosure includes: receiving circuitry, which, in operation, receives, from a roadside apparatus providing a distribution service of a road video, an advertisement message indicating that the distribution service is provided; message generating circuitry, which, in operation, generates, based on reception of the advertisement message, a message regarding transmission of the road video to the roadside apparatus; and transmitting circuitry, which, in operation, transmits the message to the roadside apparatus.

In the in-vehicle apparatus according to the present disclosure, a format of Wave Service Advertisement (WSA) is used as a format of the advertisement message.

In the in-vehicle apparatus according to the present disclosure, when the transmitting circuitry transmits the message, the receiving circuitry receives, from the roadside apparatus, identification information, installation positions, and shooting directions of a plurality of cameras each shooting a road.

The in-vehicle apparatus according to the present disclosure further includes, control circuitry, which, in operation, determines at least one piece of identification information among the pieces of identification information of the plurality of cameras each shooting the road, based on a position of a vehicle in which the in-vehicle apparatus is mounted, a direction in which the vehicle is going to travel, map data, the installation positions and the shooting directions.

In the in-vehicle apparatus according to the present disclosure, the transmitting circuitry transmits, to the roadside apparatus, the at least one piece of identification information, and the receiving circuitry receives, from the roadside apparatus, a video signal of a road video from at least one camera of the plurality of camera, the at least one camera corresponding to the at least one piece of identification information.

In the in-vehicle apparatus according to the present disclosure, the road includes a plurality of lanes; the receiving circuitry further receives intersection identification information of an intersection where the plurality of cameras are installed and lane identification information of at least one lane among the plurality of lanes shot by the plurality of cameras; and the control circuitry further determines, based on the intersection identification information and the lane identification information, identification information of a camera among the plurality of cameras each shooting the road.

In the in-vehicle apparatus according to the present disclosure, the advertisement message includes the pieces of identification information, the installation positions, and the shooting directions of the plurality of cameras each shooting the road.

In the in-vehicle apparatus according to the present disclosure, the message generating circuitry generates a second application message including the at least one piece of identification information that has been determined as the message regarding the transmission of the road video; and the receiving circuitry receives, from the roadside apparatus, a video signal of the road video captured by at least one camera among the plurality of cameras, the at least one camera corresponding to the at least one piece of identification information that has been determined.

In the in-vehicle apparatus according to the present disclosure, the road includes a plurality of lanes; the advertisement message further includes intersection identification information of an intersection where the plurality of cameras are installed and lane identification information of at least one lane among the plurality of lanes shot by the plurality of cameras; and the control circuitry further determines, based on the intersection identification information and the lane identification information, the at least one piece of identification information among the pieces of identification information of the plurality of cameras each shooting the road.

In the in-vehicle apparatus according to the present disclosure, at least one of the shooting directions is indicated by an absolute azimuth angle with a camera capturing the road video among the plurality of cameras as a reference.

In the in-vehicle apparatus according to the present disclosure, at least one of the shooting directions is indicated by a number assigned to the road with an installation position of the roadside apparatus as a reference, according to a predetermined rule.

A roadside apparatus according to the present disclosure includes: transmitting circuitry, which, in operation, transmits an advertisement message indicating provision of a distribution service of a road video from an in-vehicle apparatus; receiving circuitry, which, in operation, receives the message regarding transmission of the road video; message generating circuitry, which, in operation, generates, based on receipt of the service application message, a video distribution message including identification information, an installation position, and a shooting direction of a camera capturing the road video, and transmits the video distribution message to the in-vehicle apparatus.

A roadside apparatus according to the present disclosure includes: transmitting circuitry, which, in operation, transmits an advertisement message that indicates provision of a distribution service of a road video and includes pieces of identification information, installation positions, and shooting directions of a plurality of cameras each shooting a road; and receiving circuitry, which, in operation, receives the message regarding the transmission of the road video from an in-vehicle apparatus. In the roadside apparatus, the transmitting circuitry transmits, based on reception of the message regarding the transmission of the road video, a video signal of the road video captured by at least one camera among the plurality of cameras to the in-vehicle apparatus.

A communication method according to the present disclosure is used by an in-vehicle apparatus and includes: receiving, from a roadside apparatus providing a distribution service of a road video, an advertisement message indicating that the distribution service is provided; generating, based on the receiving of the advertisement message, a message regarding transmission of the road video to the roadside apparatus; and transmitting the message regarding the transmission of the road video to the roadside apparatus.

A communication method according to the present disclosure is used by a roadside apparatus and includes: transmitting an advertisement message indicating provision of a distribution service of a road video; receiving the message regarding the transmission of the road video from an in-vehicle apparatus; generating, based on the receiving of the message regarding the transmission of the road video, a video distribution message including identification information, an installation position, and a shooting direction of a camera capturing the road video; and transmitting the video distribution message to the in-vehicle apparatus.

A communication method according to the present disclosure is used by a roadside apparatus and includes: transmitting an advertisement message that indicates provision of a distribution service of a road video and includes pieces of identification information, installation positions, and shooting directions of a plurality of cameras each shooting a road; receiving the message regarding the transmission of the road video from an in-vehicle apparatus; and transmitting, based on the receiving of the message regarding the transmission of the road video, a video signal of the road video captured by at least one camera among the plurality of cameras to the in-vehicle apparatus.

This application is entitled to and claims the benefits of Japanese Patent Application No. 2020-124499 filed on Jul. 21, 2020 and Japanese Patent Application No. 2020-181293 filed on Oct. 29, 2020, the disclosures of which including the specifications, drawings and abstracts are incorporated herein by reference in its entirety.

INDUSTRIAL APPLICABILITY

The present disclosure is particularly advantageous for, for example, radio communication between a roadside apparatus and an in-vehicle apparatus.

REFERENCE SIGNS LIST 100, 100a, 100b, 100c, 100d Roadside apparatus
200, 200a, 200b, 200c, 200d Roadside camera
300, 400, 500 Vehicle
600 Directional beam
900 Intersection
910, 920, 930, 940, 950, 960, 970, 980 Road
1001 WSA header
1002 Service information segment
1003 Channel information segment
1004 WAVE routing advertisement
1005 Service information count
1006 PSID
1007 Channel index
1008 Reserve
1009 Service information option indicator
1010 WAVE information element extension

The invention claimed is:

1. An in-vehicle apparatus, comprising:
receiving circuitry, which, in operation, receives, from a roadside apparatus providing a distribution service of a road video, an advertisement message indicating that the roadside apparatus provides the distribution service of the road video;
message generating circuitry, which, in operation, generates, after the advertisement message is received, a message requesting transmission of the road video from the roadside apparatus to the in-vehicle apparatus; and
transmitting circuitry, which, in operation, transmits, to the roadside apparatus, the message requesting the transmission of the road video.

2. The in-vehicle apparatus according to claim 1, wherein:
a format of Wave Service Advertisement (WSA) is used as a format of the advertisement message.

3. The in-vehicle apparatus according to claim 1, further comprising:
control circuitry, which, in operation, determines, based on a position of a vehicle in which the in-vehicle apparatus is mounted, a direction in which the vehicle is going to travel, map data, and pieces of identification information, installation positions, and shooting directions of a plurality of cameras each shooting a road, at least one piece of identification information among the pieces of identification information of the plurality of cameras each shooting the road.

4. The in-vehicle apparatus according to claim 3, wherein:
when the transmitting circuitry transmits, as the message requesting the transmission of the road video, a first application message indicating an application for the distribution service, the receiving circuitry receives, from the roadside apparatus, a distribution message including the pieces of identification information, the installation positions, and the shooting directions of the plurality of cameras each shooting the road.

5. The in-vehicle apparatus according to claim 3, wherein:
the transmitting circuitry transmits a distribution request message including the at least one piece of identification information that has been determined to the roadside apparatus; and
the receiving circuitry receives, from the roadside apparatus, a video signal of the road video captured by at least one camera among the plurality of cameras, the at least one camera corresponding to the at least one piece of identification information that has been determined.

6. The in-vehicle apparatus according to claim 3, wherein:
the road includes a plurality of lanes;
the receiving circuitry further receives intersection identification information of an intersection where the plurality of cameras are installed and lane identification information of at least one lane among the plurality of lanes shot by the plurality of cameras; and
the control circuitry further determines, based on the intersection identification information and the lane identification information, identification information of a camera among the plurality of cameras each shooting the road.

7. The in-vehicle apparatus according to claim 3, wherein:
the advertisement message includes the pieces of identification information, the installation positions, and the shooting directions of the plurality of cameras each shooting the road.

8. The in-vehicle apparatus according to claim 3, wherein:
the message generating circuitry generates a second application message including the at least one piece of identification information that has been determined as the message requesting the transmission of the road video; and
the receiving circuitry receives, from the roadside apparatus, a video signal of the road video captured by at least one camera among the plurality of cameras, the at least one camera corresponding to the at least one piece of identification information that has been determined.

9. The in-vehicle apparatus according to claim 3, wherein:
the road includes a plurality of lanes;
the advertisement message further includes intersection identification information of an intersection where the plurality of cameras are installed and lane identification information of at least one lane among the plurality of lanes shot by the plurality of cameras; and
the control circuitry further determines, based on the intersection identification information and the lane identification information, the at least one piece of identification information among the pieces of identification information of the plurality of cameras each shooting the road.

10. The in-vehicle apparatus according to claim 3, wherein:
at least one of the shooting directions is indicated by an absolute azimuth angle with a camera among the plurality of cameras as a reference, the camera capturing the road video.

11. The in-vehicle apparatus according to claim 3, wherein:
at least one of the shooting directions is indicated by a number assigned to the road with an installation position of the roadside apparatus as a reference, according to a predetermined rule.

12. A roadside apparatus, comprising:
transmitting circuitry, which, in operation, transmits an advertisement message indicating that the roadside apparatus provides a distribution service of a road video;
receiving circuitry, which, in operation, receives the message requesting the transmission of the road video from the in-vehicle apparatus according to claim 1; and
message generating circuitry, which, in operation, generates, based on reception of the message requesting the transmission of the road video, a video distribution message including identification information, an installation position, and a shooting direction of a camera capturing the road video, and transmits the video distribution message to the in-vehicle apparatus.

13. A roadside apparatus, comprising:
transmitting circuitry, which, in operation, transmits an advertisement message that indicates the roadside apparatus provides a distribution service of a road video and includes pieces of identification information, installation positions, and shooting directions of a plurality of cameras each shooting a road; and
receiving circuitry, which, in operation, receives the message requesting the transmission of the road video from the in-vehicle apparatus according to claim 1, wherein the transmitting circuitry transmits, based on reception of the message requesting the transmission of the road video, a video signal of the road video captured by at least one camera among the plurality of cameras to the in-vehicle apparatus.

14. A communication method used by an in-vehicle apparatus, the communication method comprising:
receiving, from a roadside apparatus providing a distribution service of a road video, an advertisement message indicating that the roadside apparatus provides the distribution service of the road video;
generating, after the advertisement message is received, a message requesting transmission of the road video from the roadside apparatus to the in-vehicle apparatus; and
transmitting, to the roadside apparatus, the message requesting the transmission of the road video.

15. A communication method used by a roadside apparatus, the communication method comprising:
transmitting an advertisement message indicating that the roadside apparatus provides a distribution service of a road video;
receiving the message requesting the transmission of the road video from an in-vehicle apparatus that uses the communication method according to claim 14;
generating, based on the receiving of the message requesting the transmission of the road video, a video distribution message including identification information, an installation position, and a shooting direction of a camera capturing the road video; and
transmitting the video distribution message to the in-vehicle apparatus.

16. A communication method used by a roadside apparatus, the communication method comprising:
transmitting an advertisement message that indicates the roadside apparatus provides a distribution service of a road video and includes pieces of identification information, installation positions, and shooting directions of a plurality of cameras each shooting a road;
receiving the message requesting the transmission of the road video from an in-vehicle apparatus that uses the communication method according to claim 14; and
transmitting, based on the receiving of the message requesting the transmission of the road video, a video signal of the road video captured by at least one camera among the plurality of cameras to the in-vehicle apparatus.

* * * * *